(No Model.)

P. A. WHITNEY.
CLAMP SCREW.

No. 388,007. Patented Aug. 14, 1888.

Witnesses.
John Edwards Jr.
Milton H. Bassett

Inventor.
Pardon A. Whitney.
By James Shepard, Atty.

UNITED STATES PATENT OFFICE.

PARDON A. WHITNEY, OF SOUTHINGTON, CONNECTICUT.

CLAMP-SCREW.

SPECIFICATION forming part of Letters Patent No. 388,007, dated August 14, 1888.

Application filed May 19, 1888. Serial No. 274,390. (No model.)

*To all whom it may concern:*

Be it known that I, PARDON A. WHITNEY, a citizen of the United States, residing at Southington, in the county of Hartford and State of Connecticut, have invented certain new and useful Improvements in Clamp-Screws, of which the following is a specification.

My invention relates to improvements in clamp-screws; and the object of my invention is to improve the construction in securing the screw to its head, whereby a steel screw may be employed.

Figure 1:
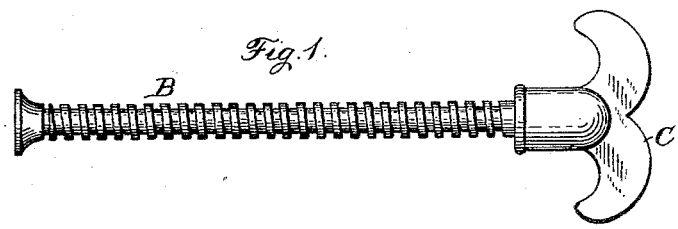
Figure 2:
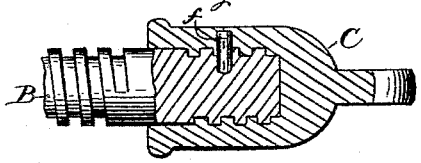
Figure 3:
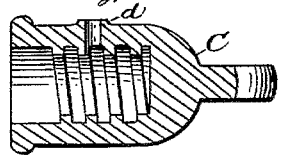
Figure 4:
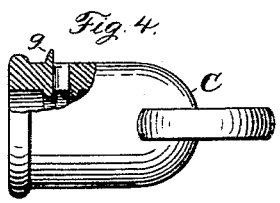

In the accompanying drawings, Figure 1 is a side elevation of my clamp-screw. Fig. 2 is a partial section and elevation of one end of the screw and the screw-head. Fig. 3 is a detached longitudinal section of the screw-head, and Fig. 4 is a partial section and elevation of said screw-head slightly modified.

The screw-head C is formed separately from the screw B, and is preferably cast of malleable metal, either iron or composition—as, for instance, brass. I prefer to cast this head on a core, so as to form a thread on its interior, with a blank space at the mouth of the hole in the head, as shown in Figs. 2, 3, and 4. The head end of the screw B is threaded to fit the thread of the hole in the head C, and preferably with a blank space between the thread that is within the screw-head and the thread on the body of the screw. I prefer to cast the screw-head C with a little boss, d, on one side, as shown in Fig. 3. The screw B is screwed into the screw-head C until it strikes the bottom of the hole therein, so that in turning the screw in the direction to screw it forward the head is perfectly firm on the screw.

In order to prevent the head from working off or unscrewing, I drill a hole through this boss d and into the screw for a short distance. I then insert a pin, f, the outer end of said pin being a little inside of the general periphery of the screw-head.

In order to hold the pin in place, I close the mouth of the hole to fasten said pin by swaging the sides of the boss inwardly over the end of the pin, and then smoothing off the surface, leaving the head of the pin neatly covered, as shown in Fig. 2. This boss may be readily thus swaged inward by first applying to it a set or punch having a conical cavity and then hammering it down.

In Fig. 4 I have shown a modification of the boss for fastening the pin, in which the boss g is in the form of a flange at one side of the pin, instead of extending entirely around it. This boss may be bent down over the head of the pin by an ordinary hand-hammer.

I claim as my invention—

The herein-described clamp screw, consisting of the screw B and the separately-formed head C, of malleable metal, and the fastening-pin f, with a portion of the metal in the screw-head set over the end of said pin, substantially as described, and for the purpose specified.

PARDON A. WHITNEY.

Witnesses:
STEPHEN WALKLEY,
E. M. STANNARD.